Jan. 9, 1951          E. E. CURTISS          2,537,514
AUTOMATIC PARKING BRAKE FOR AUTOMOBILES
Filed March 1, 1949          2 Sheets—Sheet 1
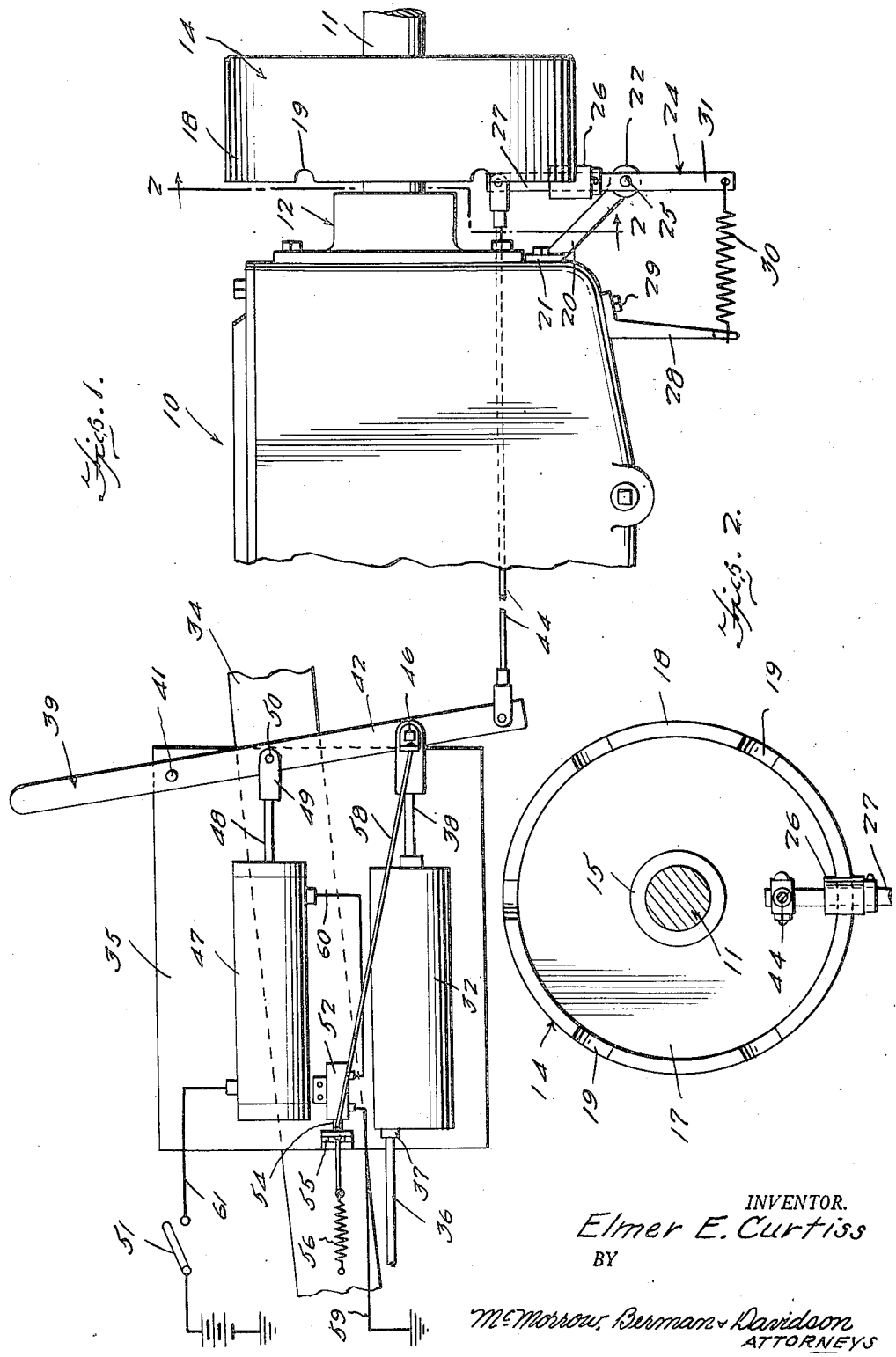
INVENTOR.
Elmer E. Curtiss
BY
McMorrow, Berman & Davidson
ATTORNEYS

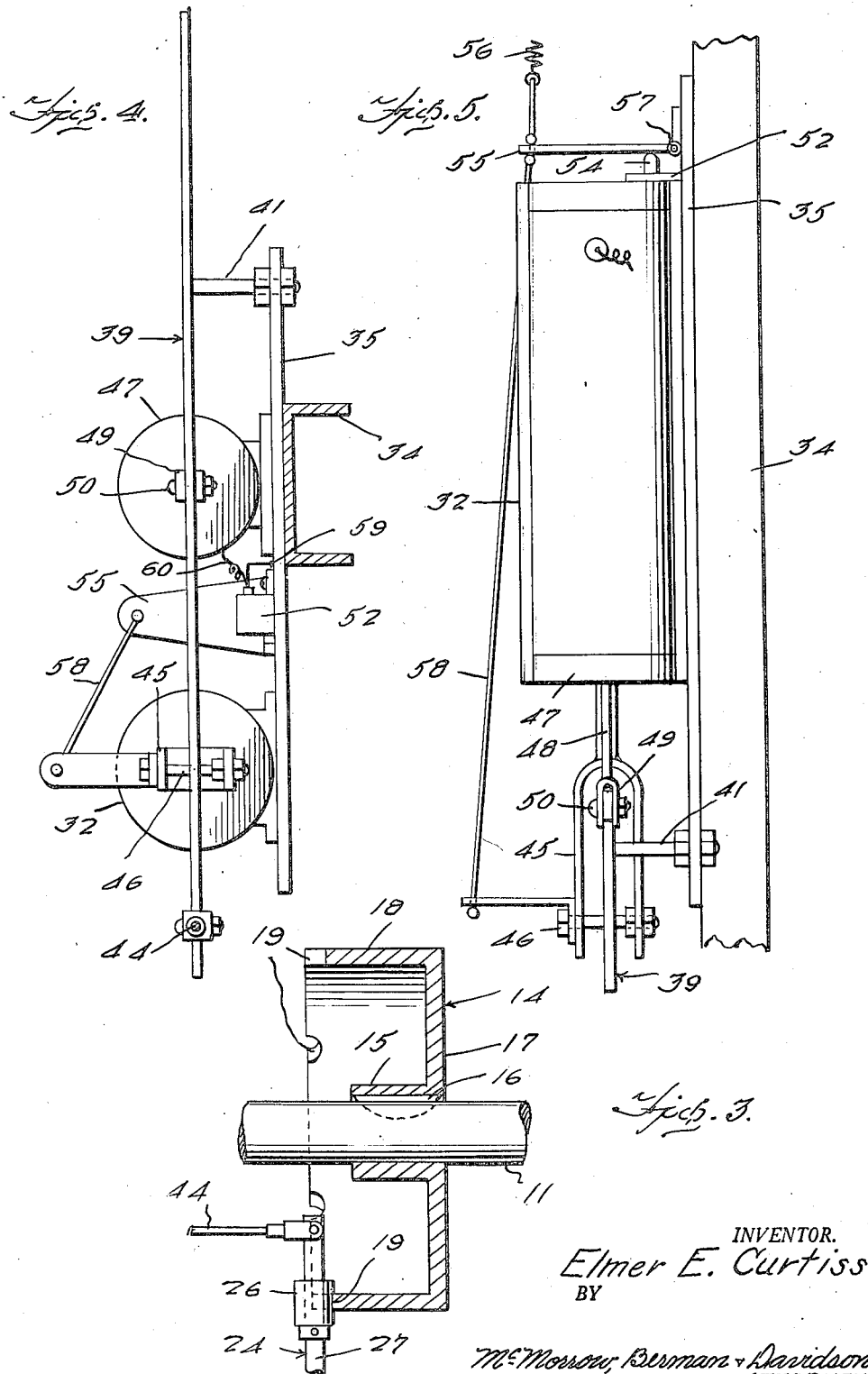

Patented Jan. 9, 1951

2,537,514

UNITED STATES PATENT OFFICE 2,537,514

AUTOMATIC PARKING BRAKE FOR AUTOMOBILES

Elmer E. Curtiss, Beaman, Mo.

Application March 1, 1949, Serial No. 78,909

4 Claims. (Cl. 192—3)

This invention relates to a parking brake for automobiles, and more particularly to an automatic parking brake actuated by the automobile engine for holding the vehicle when the engine is not running.

It is an object of this invention to provide an automatic parking brake of the kind to be more particularly described hereinafter which may be readily mounted on vehicles currently in operation, as well as in new cars presently being manufactured to provide a parking brake which may be released by actuation of the engine.

Another object of this invention is to provide a parking brake of this kind which is automatically set in braking condition when the vehicle is at rest, with the engine off, and will be moved to released position upon the normal operation of the engine.

A further object of this invention is to provide an automatic parking brake of this kind which depends on the vacuum of the intake manifold and the current of the ignition system for its normal operation, each system of operation supplementing the other for most efficient operation and operable alone only in certain cases as failure of the other during the operation of the vehicle.

With the above and other objects in view, my invention consists in the arrangement, combination and details of construction disclosed in the drawings and specification, and then more particularly pointed out in the appended claims.

In the drawings:

Figure 1 is a side elevation, partly broken away, of an automatic parking brake for automobiles constructed according to an embodiment of my invention.

Figure 2 is a transverse section, taken on the line 2—2 of Figure 1.

Figure 3 is a vertical section through the brake drum, showing the engagement of the brake drum locking element with the openings about the periphery thereof.

Figure 4 is an end elevation of the parking brake actuating mechanism, including the vacuum piston and solenoid, connected to the brake actuating lever.

Figure 5 is a top plan view of the brake actuating device, shown in Figure 4.

Referring to the drawings, the numeral 10 designates generally the case or housing of a transmission on a conventional type of vehicle having an internal combustion engine. A drive shaft 11 extends from the rear end of the transmission casing 10 and is rotatably supported by a boss or bearing 12 on the rear end of the housing 10. A brake drum 14 is fixed on the drive shaft 11 to be rotated with the drive shaft during the normal operation of the automobile.

The brake drum 14 is particularly shaped and formed as an element of a form of my invention to provide for the engagement of the locking means, to be described hereinafter. The brake drum 14 is substantially cup-shaped in configuration, having a central hub 15 which is adapted to be engaged about the drive shaft 11 and secured thereto by a key 16 to provide for the fixed connection therebetween. The body or web 17 of the brake drum 14 extends radially outwardly from one end of the hub 15, and a peripheral flange 18 is fixed to or formed integral with the outer end of the web 17. The flange 18 is spaced outwardly from the hub 15 and is formed with a plurality of circumferentially spaced apart arcuate grooves or apertures 19 on the rear edge. The notches 19 are circumferentially spaced apart about the annular flange 18 and provide seats within which the locking element, to be described hereinafter, is adapted to be engaged for securing the brake drum 14 in its locked position.

A supporting arm or bracket 20 is fixed to the rear end of the transmission casing 10 and extends downwardly to a point below the rear end of the brake drum 14. One end of the bracket 20 is fixed to the housing 10 by a bolt, as the bolts 21, and a pivot or bearing 22 is formed on the other end, below the brake drum 14. A lever 24 is pivoted, intermediate the length thereof to the pivot or bearing 22 by a pivot pin 25 and extends upwardly to a point above the circumference of the brake drum 14. The lever 24 is disposed substantially radially of the shaft 11 and the brake drum 14, and is adapted to be extended inwardly of the outer edge of the brake drum 14. A roller 26 is rotatably engaged about the upper arm 27 of the lever 24 and is adapted to be seated in one of the recesses or notches 19 for holding the brake drum 14 in its locked position.

A second bracket 28 is fixed, as by the bolts 29, to the bottom side of the transmission casing 10 and extends downwardly therefrom. A spring 30 is fixed between the lower end of the arm or bracket 28, and the lower end of the downwardly extending arm 31, of the lever 24. The spring 30 is tensioned for rocking the lever 24 about its pivot point 25 to engage the roller 26 in braking engagement with one of the notches 19.

The lever 24 is adapted to be actuated by the vacuum system of the automobile, connected to the intake manifold, and the electrical system of the vehicle which is operatively connected to the ignition system. A cylinder 32 is fixedly mounted on the frame 34 of the vehicle, adjacent the brake drum 14. A plate 35 is fixedly mounted on the frame 34 and the cylinder 32 is securely attached to the lower end of the plate. One end of the cylinder 32 is operatively connected to the intake manifold, not shown in the drawings, by a tube or pipe 36. The end of the vacuum line 36 is connected to a boss or fitting 37 on the rear end of the cylinder 32. A piston is freely slidable in the cylinder 32 and includes a shaft 38 which extends outwardly from the other end of the cylinder.

A second lever 39 is pivotally mounted on the plate 35, by a pivot pin 40 adjacent the upper edge thereof. The lower end of the depending lever arm 42, of the lever 39 is operatively connected with the upper end of the upwardly extending arm 27 of the lever 24. A flexible connecting means, as the cable 44, is secured to the lower end of the lever arm 42 and the upper end of the lever arm 27.

A fitting 45, fixed on the free end of the shaft or rod 38, is pivotally connected on the opposite sides of the arm 42, adjacent the lower end thereof. The bifurcated fitting 45 engages on the opposite sides of the arm 42 and a pivot pin, 46, provides for the connection between the fitting 45 and the lever 39.

A solenoid 47 is mounted on the plate 35, and includes a sliding armature 48 which is adapted to be connected to the lever 39. A bifurcated fitting 49 is fixed on the outer end of the armature 48 and engages on the opposite sides of the arm 42 of the lever 39 and is pivotally connected thereto by a pivot pin 50. The armature 48 is connected to the lever 39 between the pivot 41 of the lever and the connection of the shaft 38 thereto. The armature 48 is adapted to be actuated by the ignition system of the automobile and is connected to the ignition switch 51. The solenoid 47 is adapted to be used for holding the lever 24 in its brake releasing position, while the vacuum cylinder 32 is the principal operator for moving the roller 26 out of locking engagement with the brake drum. Prior to the release of the roller 26 from the notches or grooves 19 the solenoid 47 is not connected to the ignition system, but immediately after the roller 26 is moved out of the notches 19 a switch 52 is closed for connecting the solenoid to assist the vacuum cylinder 32 in holding the roller 26 in brake-releasing position.

The switch 52 is mounted on the plate 35, between the solenoid 47 and the cylinder 32, at the rear end thereof. The switch 52 includes a plunger 54 slidable therein for moving the contact member, not shown in the drawings, to circuit opening and closing positions. A plunger actuating hinge leaf or arm 55 is pivotally mounted on the plate 35 in a position for engaging the plunger 54. Within the switch 52 is a spring, not shown in the drawings, which constantly presses the plunger 54 outwardly into engagement with the arm 55. A spring 56 is fixed at one end to the frame 34 or other fixed portion of the vehicle adjacent the switch 52 and the other end of the spring is connected to the outer side of the hinge leaf or arm 55. The spring 56 normally urges the arm 55 rearwardly about its pivot 57 to permit the plunger 54 to slide outwardly of the switch 52 and the contact therein will be pressed to circuit closing position. A flexible member 58 is connected at one end to the pivot pin 46, of the vacuum cylinder 32 and at the other end to the forward side of the arm 55. As the levers 24 and 42 are normally spring spressed to braking position, the hinge leaf 55 will be spring pressed forwardly about its hinge to the normal circuit breaking position. Only when th lever 42 is moved rearwardly, at its lower end, about the pivot 41 will the spring 56 swing the arm 55 rearwardly to permit the plunger 54 to slide outwardly to circuit closing position.

One side of the switch 52 is connected to the ground of the ignition circuit by a circuit connecting member 59 and the other side of the switch is operatively connected by a circuit connecting means 60 to one side of the solenoid 47. The other side of the solenoid 47 is operatively connected by a lead 61 to one pole of the ignition switch 51 whereby the electrical circuit to the solenoid 47 may be completed when the switch 52 and the ignition switch 51 are closed.

In the use and operation of the parking brake of this invention, while the vehicle is at rest and the engine turned off, the spring 30 will bias the lever 24 about its pivot 25 for engaging the roller 26 into one of the notches 19. This engagement will lock the brake drum against rotation and therefore lock the drive shaft 11. For releasing the roller 26 out of the notches 19, the ignition switch 51 is initially closed for starting the engine. The initial closing of the ignition switch 51 will not affect the solenoid 47 as the switch 52 is normally biased to the open position. When the engine is started and a vacuum is set up in the intake manifold, the vacuum will draw the shaft 38 inwardly of the cylinder 32 and therefore rock the lever 39 clockwise in the drawings about the pivot 41 for moving the lever 24 counter-clockwise and the roller 26 out of engagement with the brake drum. From this brake releasing position, the automobile is free for normal operation.

Upon rearward movement of the shaft 38, the spring 56 will swing the arm 54 rearwardly to permit the plunger 54 to slide out of the switch 52 thereby closing the contact within the switch for completing the circuit to the solenoid 47.

While initially the force of the vacuum line acting on the cylinder 32 is sufficient for moving the roller 26 out of locking engagement with the brake drum, in the operation of the vehicle the vacuum pressure is variable and at certain times, as in hard pulls, the vacuum line will not be sufficient for holding the braking element out of engagement with the brake drum. As the switch 52 has been closed after the braking element has been initially moved to brake releasing position, the force of the solenoid on the armature 48 will supplement the force exerted on the shaft 38 for holding the lever 39 rearwardly in the brake-releasing position and holding the braking element 26 out of engagement with the brake drum 14.

The diameter of the roller 26 is substantially equal to the diameter of the arcuate recesses 19, so that a firm and secure engagement is provided. This close tolerance between the engagement of the braking element 26 in the groove 19 also provides for the free movement of the vehicle at such time as the vehicle is under movement with the ignition turned off and the vacuum line bearing insufficient pressure for holding the braking element out of engagement with the brake drum. When the braking element 26 is free to be moved into engagement with the periphery of the brake drum 14, while the brake drum 14 is rotating, the braking element 26 will not seat in any one of the recesses 19 until the rotation of the brake drum 14 has been slowed down sufficiently for the secure engagement of the roller 26 in the notches.

I do not mean to confine myself to the exact details of construction herein disclosed, but claim all variations falling within the purview of the appended claims.

What is claimed is:

1. A parking brake for a vehicle having an internal combustion engine, a drive shaft and a transmission housing comprising a brake drum fixed on said shaft and formed with a plurality of circumferentially spaced apart apertures therein, a lever rockably mounted on said transmission housing and spring pressed to rocking engagement with said apertures, a second lever rockable on said vehicle and operatively connected to said first lever for rocking therewith, a cylinder mounted on said vehicle, a piston slidable in said cylinder and operatively connected to said second lever, means operatively connecting said cylinder to the intake manifold of the vehicle for actuating said first lever out of engagement with said brake drum upon operation of the vehicle engine, a solenoid operatively connected with said second lever for holding said second lever in brake releasing position, and circuit connecting means including a normally open switch closed upon movement of said first lever to brake releasing position operatively connecting said solenoid with the vehicle ignition switch.

2. A parking brake for a vehicle having an internal combustion engine and a drive shaft comprising a brake drum fixed on said shaft, a braking element spring pressed for braking engagement with said brake drum, means operatively connected with said braking element and the intake manifold of the vehicle for initially moving said braking element to brake releasing position, and means, including a normally open switch closed upon movement of said first means to brake releasing position, operatively connected to said braking element and the ignition circuit of the vehicle for holding said braking element in brake releasing position after initial movement to brake releasing position by said first means.

3. A parking brake for a vehicle having an internal combustion engine, and a drive shaft, comprising a brake drum fixed on said shaft, a braking element spring pressed for braking engagement with said brake drum, means operatively connected with said braking element and the intake manifold of the vehicle for initially moving said braking element to brake-releasing position, a solenoid having an armature, said armature being operatively connected to said braking element to move therewith, and a normally open switch, closed upon movement of said first means to brake-releasing position, said switch being operatively connected to said braking element and connected in an electrical circuit including said solenoid and the ignition switch of the engine, said normally open switch and said ignition switch being in series and together serving to control said solenoid, said solenoid serving for holding said braking element in brake-releasing position after initial movement to brake-releasing position by said first means.

4. A parking brake for a vehicle having an internal combustion engine, a drive shaft, and a transmission housing, comprising a brake drum fixed on said shaft and formed with a plurality of circumferentially spaced apart apertures therein, a lever rockably mounted on said transmission housing and spring pressed to rocking engagement with said apertures, a second lever rockable on said vehicle and operatively connected to said first lever for rocking therewith, a cylinder mounted on said vehicle, a piston slidable on said cylinder and operatively connected to said second lever, means operatively connecting said cylinder to the intake manifold of the engine for actuating said first lever out of engagement with said brake drum upon operation of the engine, a solenoid having an armature, said armature being operatively connected with said second lever to move therewith for holding said second lever in brake-releasing position, and electrical circuit connecting means including a normally open switch which is closed upon movement of said first lever to brake-releasing position, said normally open switch serving to complete a circuit through the engine battery, ignition switch, and said solenoid, said two switches being connected in series so that said solenoid will be energized only when both of said switches are closed.

ELMER E. CURTISS.

REFERENCES CITED

The following references are of record in the file of this patent:

UNITED STATES PATENTS

| Number | Name | Date |
|---|---|---|
| 1,322,171 | Wherry | Nov. 18, 1919 |
| 1,958,356 | Webb | May 8, 1934 |
| 2,007,593 | Brown | July 9, 1935 |
| 2,031,062 | Peabody | Feb. 18, 1936 |
| 2,130,892 | Morphet | Sept. 20, 1938 |
| 2,327,559 | Reavis | Aug. 24, 1943 |
| 2,335,533 | Reavis | Nov. 30, 1943 |